United States Patent [19]

Gatz

[11] Patent Number: 5,499,159
[45] Date of Patent: Mar. 12, 1996

[54] MATING RING FOR A WATTHOUR METER COVER

[75] Inventor: Christopher Gatz, West Lafayette, Ind.

[73] Assignee: Landis & Gyr Energy Management, Inc., Lafayette, Ind.

[21] Appl. No.: 294,484

[22] Filed: Aug. 23, 1994

[51] Int. Cl.$^6$ .................................................. H02B 9/00
[52] U.S. Cl. ............................ 361/667; 70/164; 220/324; 292/256.6
[58] Field of Search ................................. 292/256, 256.6, 292/256.63, 256.65, 307 R; 220/319, 324; 70/19, 158, 164, 166, 167, 170, 171; 285/407; 324/110, 156; 439/146, 167, 508, 517; 361/659, 664, 665, 667, 672; 403/338

[56] References Cited

U.S. PATENT DOCUMENTS

| | | | |
|---|---|---|---|
| 3,628,096 | 12/1971 | Drew, Jr. .................................. | 361/664 |
| 3,846,677 | 11/1974 | Keever ..................................... | 317/107 |
| 3,928,788 | 12/1975 | Finnen ..................................... | 317/111 |
| 3,943,441 | 3/1976 | Shackford ............................... | 361/664 |
| 4,068,288 | 1/1978 | Finnen ..................................... | 361/369 |
| 4,146,258 | 3/1979 | Androchiw ............................ | 292/256.6 |
| 4,149,741 | 4/1979 | Lipscomb ............................... | 292/256.6 |
| 5,001,420 | 3/1991 | Germer et al. ......................... | 324/142 |

*Primary Examiner*—Gerald P. Tolin
*Attorney, Agent, or Firm*—Woodard, Emhardt, Naughton, Moriarty & McNett

[57] ABSTRACT

A mating ring for mounting a meter cover to a meter base includes a molded plastic mating ring having portions configured to engage the meter cover flange and portions configured to engage the meter base. A plurality of wedges and opposing ring flanges are provided on the ring to hold the cover flange. The wedges have a sloped surface to facilitate assembly using a donut press. The mating ring engagement features are designed to facilitate one piece molding of the ring.

4 Claims, 3 Drawing Sheets

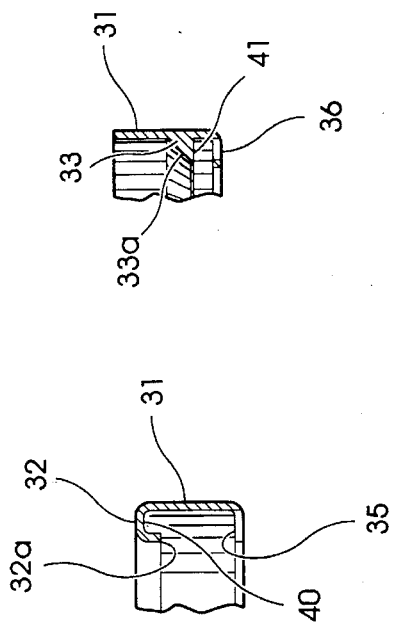
Fig. 5
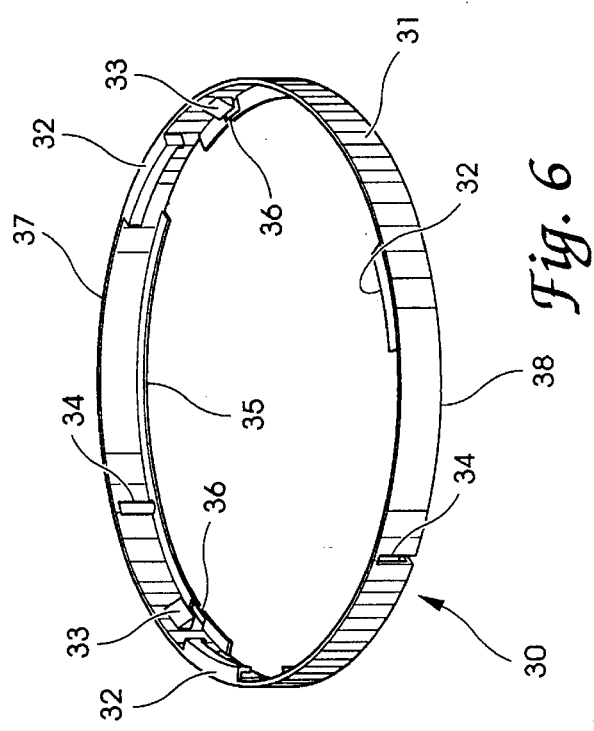
Fig. 6
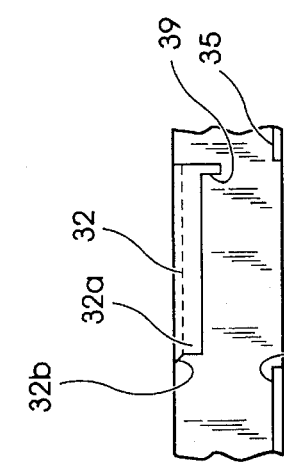
Fig. 4
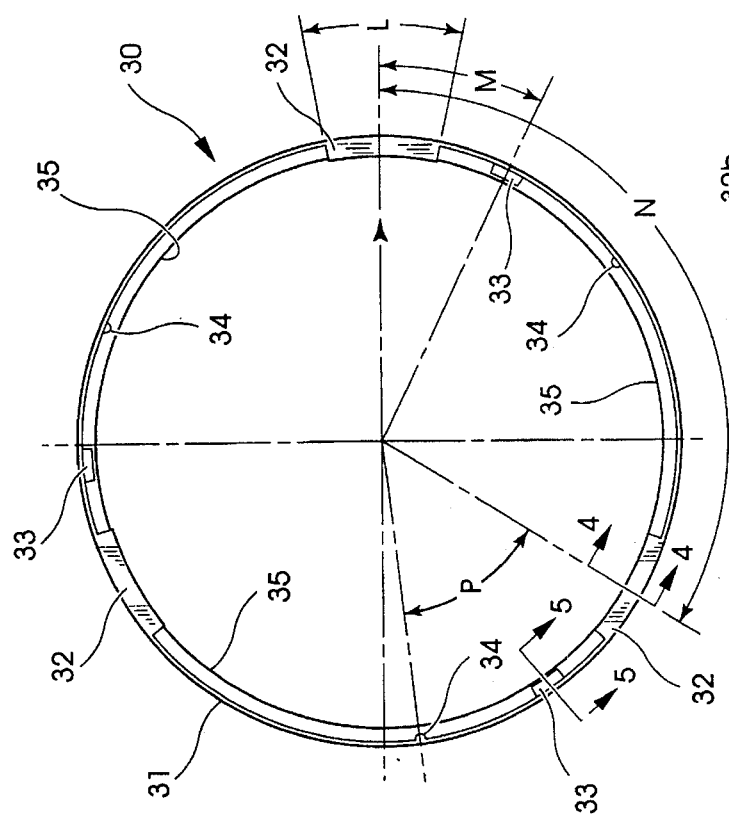
Fig. 3
Fig. 2

5,499,159

MATING RING FOR A WATTHOUR METER COVER

BACKGROUND OF THE INVENTION

This invention relates generally to improvements in covers for electrical energy meters, such as watthour meters. The invention particularly concerns a composite cover and an improved mating ring.

Watthour meter covers function to protect the meter's measuring element from the weathering environment, to prevent tampering and to provide a safety barrier for the voltage potential across the meter. The electrical energy metering industry normally utilizes a circular metallic mating ring to facilitate the attachment of the dome shaped plastic or glass meter cover to the meter base. The metallic mating ring and clips are typically made of stainless steel or aluminum and are spot-welded together. Metal mating rings are assembled from several parts which require roll forming, punching and spot welding to complete the manufacture of the ring. The clips are normally spot welded onto the ring when engaged to the meter cover flange. Due to the fabrication process, the metal ring is costly and requires significant tooling and assembly fixtures to assure consistent results.

The fabricated metal mating ring also limits the flexibility of controlling the relative location of optical ports and reset hardware features on the meter covers. The stainless steel mating ring has other disadvantages due to the fact that its sharp edges often result in minor cuts to personnel during the forming and assembly operations.

SUMMARY OF THE INVENTION

These problems and difficulties of prior metal rings are addressed by a mating ring formed in accordance with the present invention from a single piece of molded plastic. The plastic ring includes means integrally formed with the ring for attaching the ring to a watthour meter cover. Also, the ring includes means integrally formed onto the ring for mating the ring to a watthour meter. In particular, the ring includes an arrangement of openings and wedges that allow the ring to be snapped onto the meter cover and then engaged in known fashion to the meter base.

One object of the present invention is to provide an improved means for attaching the cover of a watthour meter to the meter base. A further object resides in the provision of a mating ring that is efficient to manufacture and easy to assemble with the meter cover.

Related objects and advantages of the present invention will be apparent from the following description.

BRIEF DESCRIPTION OF THE DRAWINGS

FIG. 2 is a top plan view of a mating ring for watthour meter covers according to another embodiment of the present invention.

FIG. 3 is a partial view of the mating ring of FIG. 2 looking along the direction of arrow C.

FIG. 4 is a partial sectional view of the mating ring of FIG. 2 along section 4—4.

FIG. 5 is a partial sectional view of the mating ring of FIG. 2 taken along section 5—5.

FIG. 6 is an isometric view of the mating ring of FIG. 3.

DESCRIPTION OF THE PREFERRED EMBODIMENTS

Figure 1:
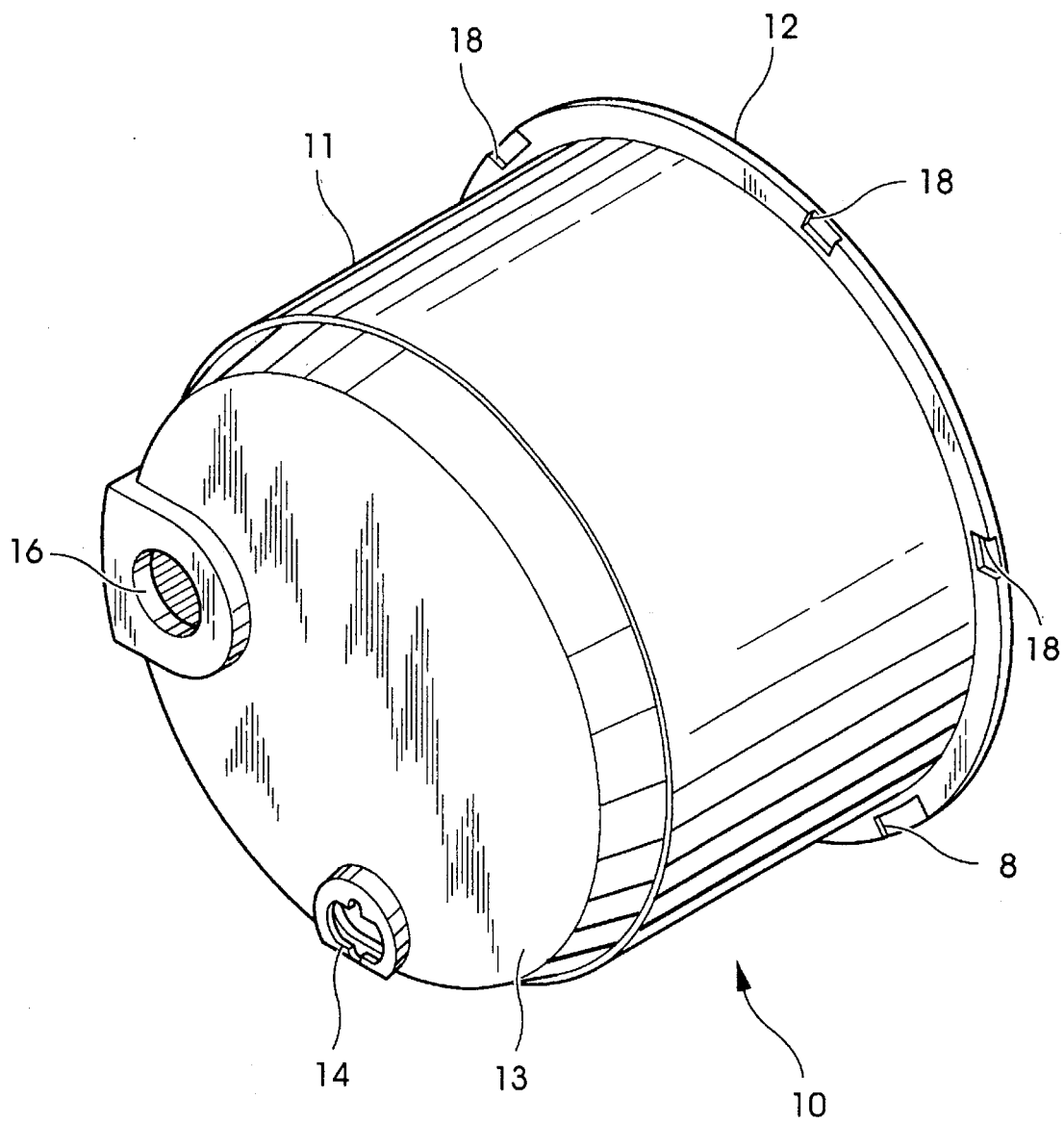
FIG. 1 is an isometric view of a plastic housing for a watthour meter cover according to one embodiment of the present invention.
Figure 7:
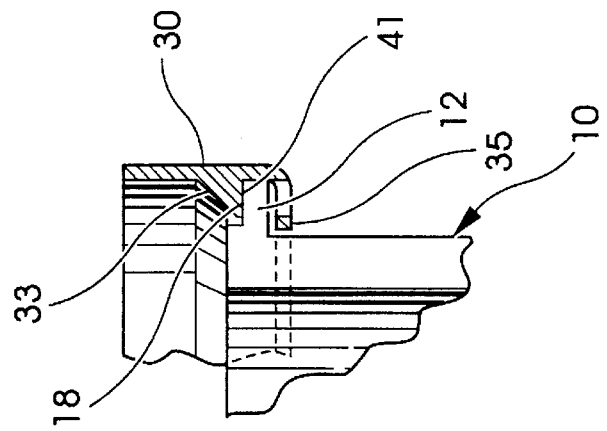
FIG. 7 is a partial sectional view of a mating ring analogous to FIG. 5 but also showing a watthour meter cover attached thereto.
Figure 8:
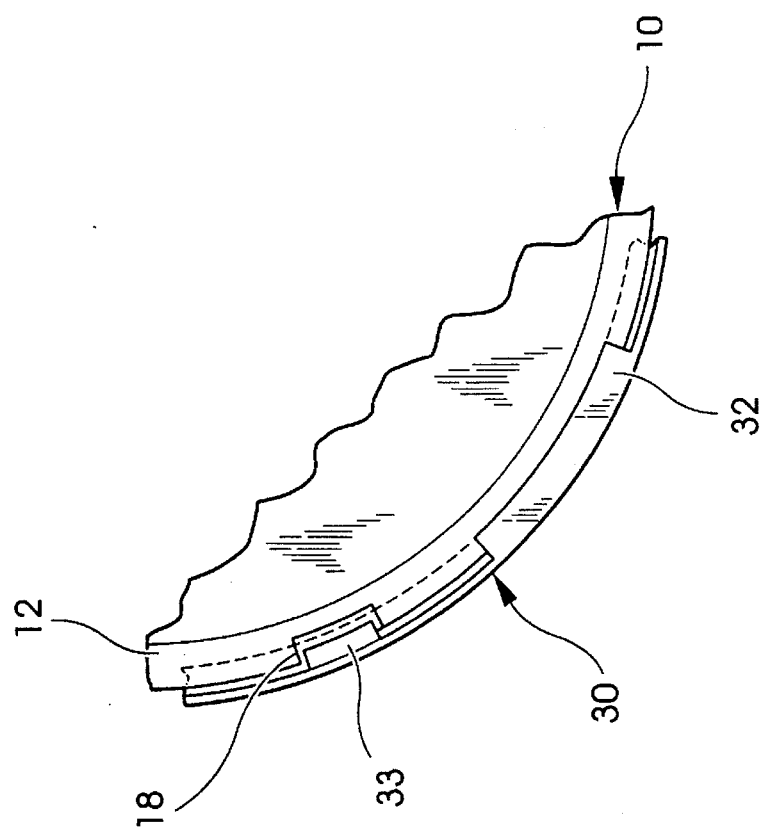
FIG. 8 is a partial top plan view of a mating ring attached to a watthour meter cover.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a watthour meter cover 10 for use in connection with the present invention. The cover 10 includes a cylindrically shaped body portion 11, annular flange 12 and a front face 13. Annular flange 12 can be molded for attachment to the inventive mating ring as shown. Front face 13 of the cover 10 includes openings 14 and 16, which can be included for receiving such features as external reset hardware and an external reader/programmer viewport.

At least the cylindrical body 11 of the meter cover 10 is formed of a high temper plastic. Likewise, the flange 12 is molded from plastic, preferably integral with the body 11. The flange 12 includes several indentations 18 spaced around the perimeter for engaging the cover ring as described herein.

Referring now to FIGS. 2–8, there is shown a mating ring for the watthour meter cover 10, according to one embodiment of the present invention. Conventional watthour meter covers are normally connected to the base of the meter via a mating ring. Mating ring 30 of the present invention is molded as one piece from high-impact thermoplastic material that is also preferably resistant to ultraviolet radiation.

Mating ring 30 includes a cylindrical wall 31, a number of cut-outs and a number of inwardly projecting molded forms which facilitate the mating of the watthour meter cover to the meter base via the mating ring. In order to facilitate attachment of the cover to the meter base, a plurality of channel locks 32 are arranged in a predetermined spaced-apart relationship adjacent to top rim 37 of mating ring 30. Each channel lock 32 has an angular length of L degrees as measured from the center of the ring. Angular length L is preferably between 20 and 22 degrees in order to correspond to a standard meter base. Channel locks 32 are distributed in equal angles around the ring such that angle N between successive locks is about 120 degrees. As shown in FIGS. 3 and 4, each channel lock 32 includes a channel 40 and a backstop 39 in order to correspond to the mating flanges and surfaces of the meter base. Channel locks 32 can include a cantilever hook wall 32a which operates as a spring as the mating portion of the meter base is received within channel 40. In addition, the leading edge 32b of the lock 32 can be beveled to facilitate rotational engagement of the ring to the meter base.

Mating ring 30 also includes three security seal slots 34 which engage a mating feature on the base of a conventional meter to assure proper alignment of the mating ring and watthour meter cover. Security seal slots 34 are also distributed 120 degrees apart around the ring. Each security seal slot 34 is offset from the center of the nearest channel lock 32 at an angle P to facilitate molding these features. Angle P is preferably between 51 and 53 degrees.

The lower rim 38 of mating ring 30 includes three radially inward projecting flanges 35. Each flange 35 covers the angular distance between each channel lock 32, as best seen in FIGS. 3 and 6. The three flanges 35 define spaces under each channel lock 32 to better facilitate the molding process for forming the mating ring.

Connection of ring 30 to the meter cover is accomplished by cooperative action between flange 35 and retainer wedges 33 projecting from the inside of the cylindrical wall 31. Each retainer wedge 33 is located an angle M from the nearest channel lock 32, which is preferably about 24 or 25 degrees to facilitate molding. Each flange 35 includes a small rectangular shaped core-out section 36 which is disposed directly beneath wedge-shaped retainer 33 to better facilitate the molding process. FIG. 5 shows an enlarged cross section of one retainer wedge 33. Retainer 33 includes a lower retaining surface 41 which abuts a surface of the meter cover flange 12. The mating ring 30 is shown attached to a watthour meter cover in FIGS. 7 and 8. The annular flange 12 on the meter cover is trapped between retaining surface 41 of wedge 33 and flange 35 of the ring. (FIG. 7) More particularly, the annular flange 12 of conventional watthour meter covers 10 includes several indentations 18 (FIG. 8) cut into flange 12 and having a width to correspond to the width of retainer wedges 33 so that the wedges will reside in the indentations. This feature ensures that the meter cover 10 will be unable to rotate with respect to mating ring 30 after being properly attached thereto. Preferably, the gap between the ring flange 35 and the retaining surface 41 of wedge 33 is slightly smaller than the thickness of the meter cover flange 12 and slightly greater than the thickness of the flange 12 at the indentations 18.

Mating ring 30 is preferably attached to a watthour meter cover using a donut press to irreversibly snap-fit the ring over the cover. Specifically, the ring 30 is oriented over the meter cover flange 12 so that a flange indentation 18 is aligned with a retaining wedge 33. The ramp shape of wedge 33 allows the cover flange to slide over the inclined surface 33a of the wedge and then snap back over the wedge between surface 41 and ring flange 35.

Preferably, the various mating surfaces disposed on the inner side of mating ring 30 are arranged in such a way as to assure the relative position of various features of the watthour meter cover with respect to the meter. In other words, they are arranged to assure the relative position of optical ports or reset hardware located on the cover to the corresponding part of the watthour meter concealed within the cover after assembly. In addition, the arrangement and configuration of the wedges and flanges of the ring facilitate forming the ring in an injection molding process.

While the invention has been illustrated and described in detail In the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A mating ring mounting a meter cover onto a meter base in which the meter cover includes an annular flange at its open end, the mating ring comprising:

a cylindrical wall having an inner surface;

base attachment means defined on said inner surface removably attaching said wall to a meter base; and cover attachment means integral with said wall attaching said wall to an annular flange of a meter cover, said cover attachment means including:

a plurality of ring flanges-projecting radially inward from said inner surface; and a plurality of wedges opposing said plurality of ring flanges, each of said wedges defining a retaining surface directed toward said ring flanges and spaced apart therefrom to receive the annular flange of the meter cover between said ring flanges and said wedges, said wedges further defining an inclined surface opposite said retaining surface on which the annular flange of the meter cover slides before snapping between said wedges and said ring flanges.

2. The mating ring according to claim 1, wherein said plurality of ring flanges define a plurality of openings axially aligned with one of said plurality of wedges.

3. The mating ring according to claim 1 wherein the ring is formed of a high-impact thermoplastic.

4. The mating ring according to claim 1, wherein said base attachment means includes a plurality of channel locks integral with said cylindrical wall, disposed opposite and between said plurality of ring flanges.

\* \* \* \* \*